US007502328B2

(12) United States Patent
Lee et al.

(10) Patent No.: US 7,502,328 B2
(45) Date of Patent: Mar. 10, 2009

(54) METHOD OF MONITORING LINK PERFORMANCE AND DIAGNOSING ACTIVE LINK STATE IN ETHERNET PASSIVE OPTICAL NETWORK

(75) Inventors: Ho Sook Lee, Daejeon (KR); Jee Sook Eun, Jeollabuk-do (KR); Tae Whan Yoo, Daejeon (KR); Bong Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 665 days.

(21) Appl. No.: 11/286,632

(22) Filed: Nov. 22, 2005

(65) Prior Publication Data

US 2006/0221841 A1    Oct. 5, 2006

(30) Foreign Application Priority Data

Mar. 29, 2005    (KR)    ............... 10-2005-0026000

(51) Int. Cl.
H04L 12/26    (2006.01)
(52) U.S. Cl. .................................... 370/242; 370/241.1
(58) Field of Classification Search ................ 370/231, 370/216, 236.1, 236, 236.2, 238, 238.1
See application file for complete search history.

(56) References Cited

U.S. PATENT DOCUMENTS 6,167,025 A * 12/2000 Hsing et al. ................. 370/216
2004/0136713 A1 * 7/2004 Lim et al. ..................... 398/66
2004/0184474 A1 * 9/2004 Kim et al. .................... 370/445

OTHER PUBLICATIONS

"OAM Work Item #3 Periodic Reporting of BER", IEEE 802.3 EFM Task Force, Sep. 2002, 8 pages.
"IEEE Draft P802.3ah tm/D3.3", Copyright 2004 IEEE, 267 pages.

* cited by examiner

Primary Examiner—Brenda Pham
(74) Attorney, Agent, or Firm—Blakely, Sokoloff, Taylor & Zafman LLP

(57) ABSTRACT

Provided is a method of monitoring link performance and diagnosing an active link state without interrupting traffic in an Ethernet passive optical network (EPON) while the link is in the active state. The method of monitoring link performance and diagnosing an active link state without interrupting data flow to logic links which are in active states in the EPON, includes: a) allowing an operator of the EPON to select a link performance monitoring function or a link active state diagnosing function; b-1) if the link performance monitoring function is selected, setting a monitoring cycle timer and periodically transmitting a performance information request frame from a local node to a remote node; b-2) if the remote node receives the performance information request frame, collecting corresponding link performance information and transmitting a response frame from the remote node to the local node in a format which is predetermined in accordance with a corresponding frame format; b-3) if the local node receives the response frame from the remote node, analyzing the performance information of the response frame and determining whether the link performance has deteriorated or if a failure has occurred in the local node; b-4) if the deterioration of the link function or the degree of the failure reaches a predetermined threshold, reporting to an upper layer that a failure has occurred.

12 Claims, 6 Drawing Sheets

METHOD OF MONITORING LINK PERFORMANCE AND DIAGNOSING ACTIVE LINK STATE IN ETHERNET PASSIVE OPTICAL NETWORK

CROSS-REFERENCE TO RELATED PATENT APPLICATION

This application claims the benefit of Korean Patent Application No. 10-2005-0026000, filed on Mar. 29, 2005, in the Korean Intellectual Property Office, the disclosure of which is incorporated herein in its entirety by reference.

BACKGROUND OF THE INVENTION

1. Field of the Invention

The present invention relates to a method of monitoring link performance and diagnosing an active link state in an Ethernet passive optical network (EPON), and more particularly, to a method of monitoring link performance and diagnosing an active link state without interrupting traffic in an Ethernet passive optical network (EPON) while the link is in the active state.

2. Description of the Related Art

An operations, administration, and maintenance (OAM) function is a link diagnosing function enabling an operation to monitor a link state of a network or find a failure location when a link failure occurs. The OAM function includes a loop-back function, a link monitoring function, and a remote failure detecting function. The loop-back function measures link performance between data terminal equipments (DTE). For example, if it is assumed that there is data terminal equipment DTE-A and DTE-B, the data terminal equipment DTE-A (or DTE-B) transmits data and the data terminal equipment DTE-B (or DTE-A) receives and retransmits the data, thereby measuring the link performance.

The link monitoring function is a mechanism for monitoring a transmission/reception state of the link between the DTEs over a period of time.

The remote failure detecting function is a mechanism for reporting a failure state to another DTE when a failure occurs in a remote node.

On the other hand, network transmission standards of an Ethernet passive optical network (EPON) was decided in IEEE 802.3ah standard. The IEEE 802.3ah standard includes a transmission standard of the EPON as well as an OAM function standard of an Ethernet network for point-to-point connection. In the IEEE 802.3ah standard, an OAM sublayer is located above a media access control (MAC) layer and a specific Ethernet frame called an OAM protocol data unit (PDU) is defined, thereby standardizing usable OAM functions.

However, since the loop-back function defined in the IEEE 802.3ah standard blocks or loops back efficient data in the network in a loop-back testing period, the efficient data may be lost. Although test data is generated and the loop-back function is performed using the test data, data cannot be transmitted during the loop-back process and thus the link monitoring function can not be performed during an active period of the link. Also, in the IEEE 802.3ah standard, the link monitoring function is not separately defined, and, if necessary, a query on performance information of a remote node can be performed using the OAM PDU during the loop-back process. That is, in the prior art, since the loop-back function in the IEEE 802.3ah standard causes the loss of efficient data, it is not suitable for monitoring the performance of a link which is in an active state.

SUMMARY OF THE INVENTION

The present invention provides a method of monitoring link performance and diagnosing an active link state without interrupting traffic in an Ethernet passive optical network (EPON) while the link is in an active state.

According to an aspect of the present invention, there is provided a method of monitoring link performance and diagnosing an active link state without interrupting data flow to logic links which are in active states in an EPON, including: a) allowing an operator of the EPON to select a link performance monitoring function or a link active state diagnosing function; b-1) if the link performance monitoring function is selected, setting a monitoring cycle timer and periodically transmitting a performance information request frame from a local node to a remote node; b-2) if the remote node receives the performance information request frame, collecting corresponding link performance information and transmitting a response frame from the remote node to the local node in a predetermined format in accordance with a corresponding frame format; b-3) if the local node receives the response frame from the remote node, analyzing the performance information of the response frame and determining whether the link performance has deteriorated or if a failure has occurred; b-4) if the deterioration of the link function or the degree of the failure reaches a predetermined threshold, reporting to an upper layer that the failure has occurred.

In an exemplary embodiment of the present invention, the performance information request frame may be a variable request frame corresponding to an Ethernet OAM (operations, administration, and maintenance) frame of the IEEE 802.3ah standard.

In an exemplary embodiment of the present invention, the method may further include, if the link active state diagnosing function is selected, c-1) successively transmitting from the local node a predetermined number of OAM frames which request the performance information of the remote node; c-2) if the remote node receives the OAM frames, transmitting from the remote node to the local node the performance information corresponding to the OAM frames in an OAM frame format; c-3) analyzing transmission/reception state information contained in the performance information received from the remote node to determine whether a FCS error exists, and determining that the link is in an active state if the data rate of the remote node is maintained above a predetermined value; and c-4) if a normal response from the remote node is delayed or a lost response frame exists in the response frames, determining that a failure has occurred in the link and transmitting a failure message from the local node to an upper layer.

BRIEF DESCRIPTION OF THE DRAWINGS

The above and other features and advantages of the present invention will become more apparent by describing in detail exemplary embodiments thereof with reference to the attached drawings in which:

FIG. 5 illustrates structures of Ethernet operations, administration, and maintenance (OAM) frames used in the present invention, wherein

DETAILED DESCRIPTION OF THE INVENTION

The present invention will now be described more fully with reference to the accompanying drawings, in which exemplary embodiments of the invention are shown. Meaning of terminology used herein should be determined in consideration of functionality of the present invention, and it may be variable depending on user's or operator's intentions, or customs in the art. Therefore, corresponding meaning should be determined with reference to the entire pages of the specification.

Figure 1:
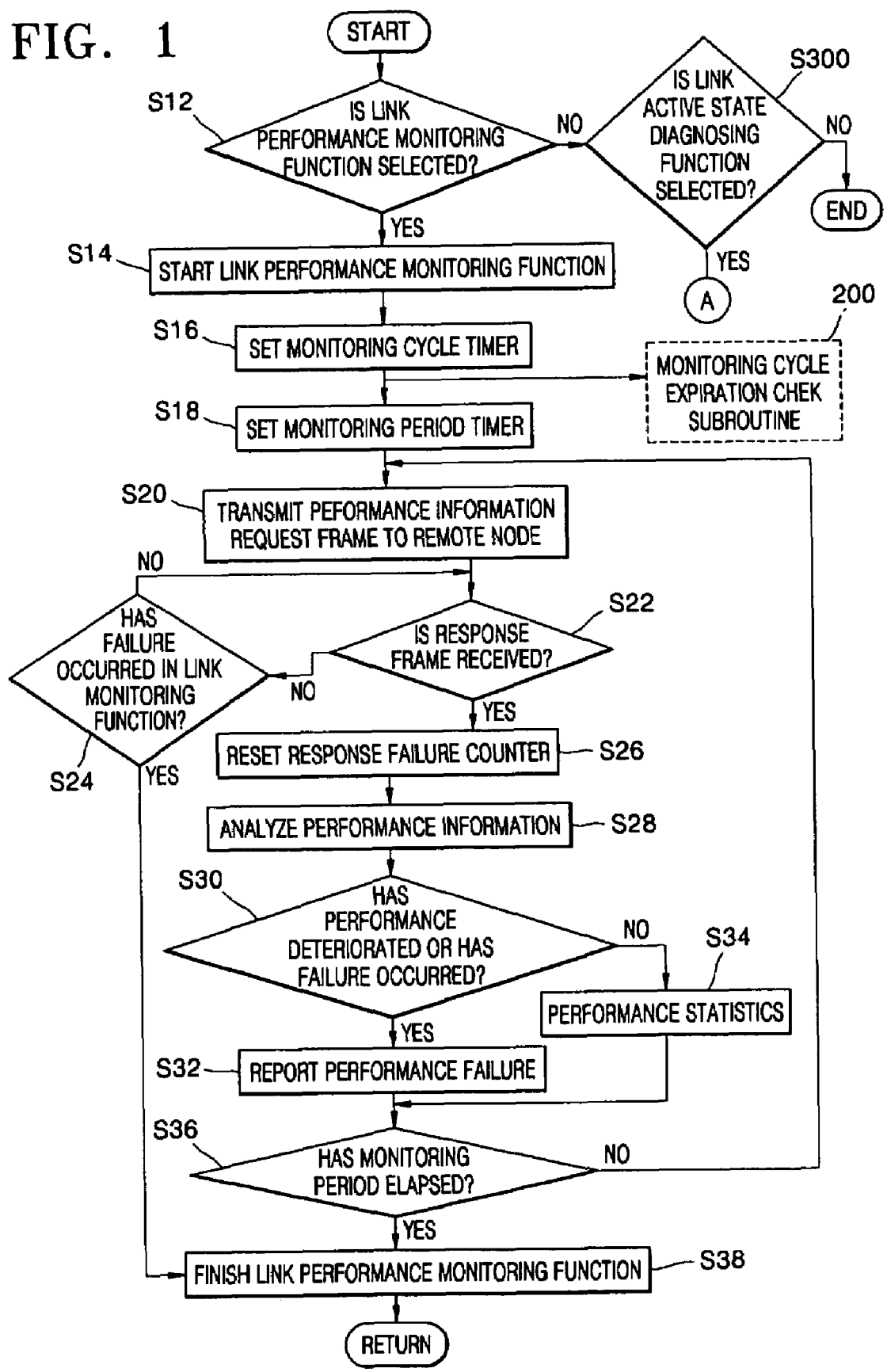
FIG. 1 is a flowchart of a link performance monitoring method in an Ethernet passive optical network (EPON) according to an embodiment of the present invention.
Figure 2:
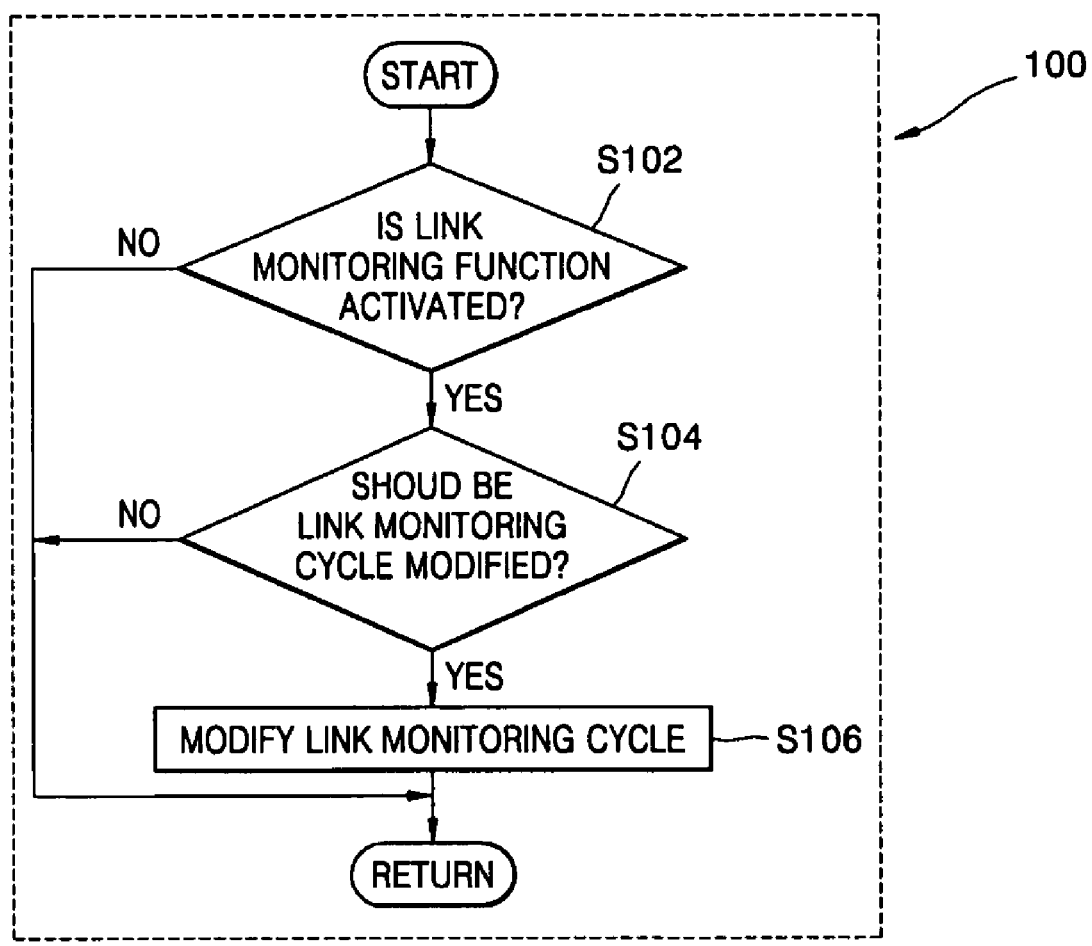
FIG. 2 is a flowchart of a monitoring cycle modifying subroutine of the link performance monitoring method in the EPON according to the embodiment of the present invention.
Figure 3:
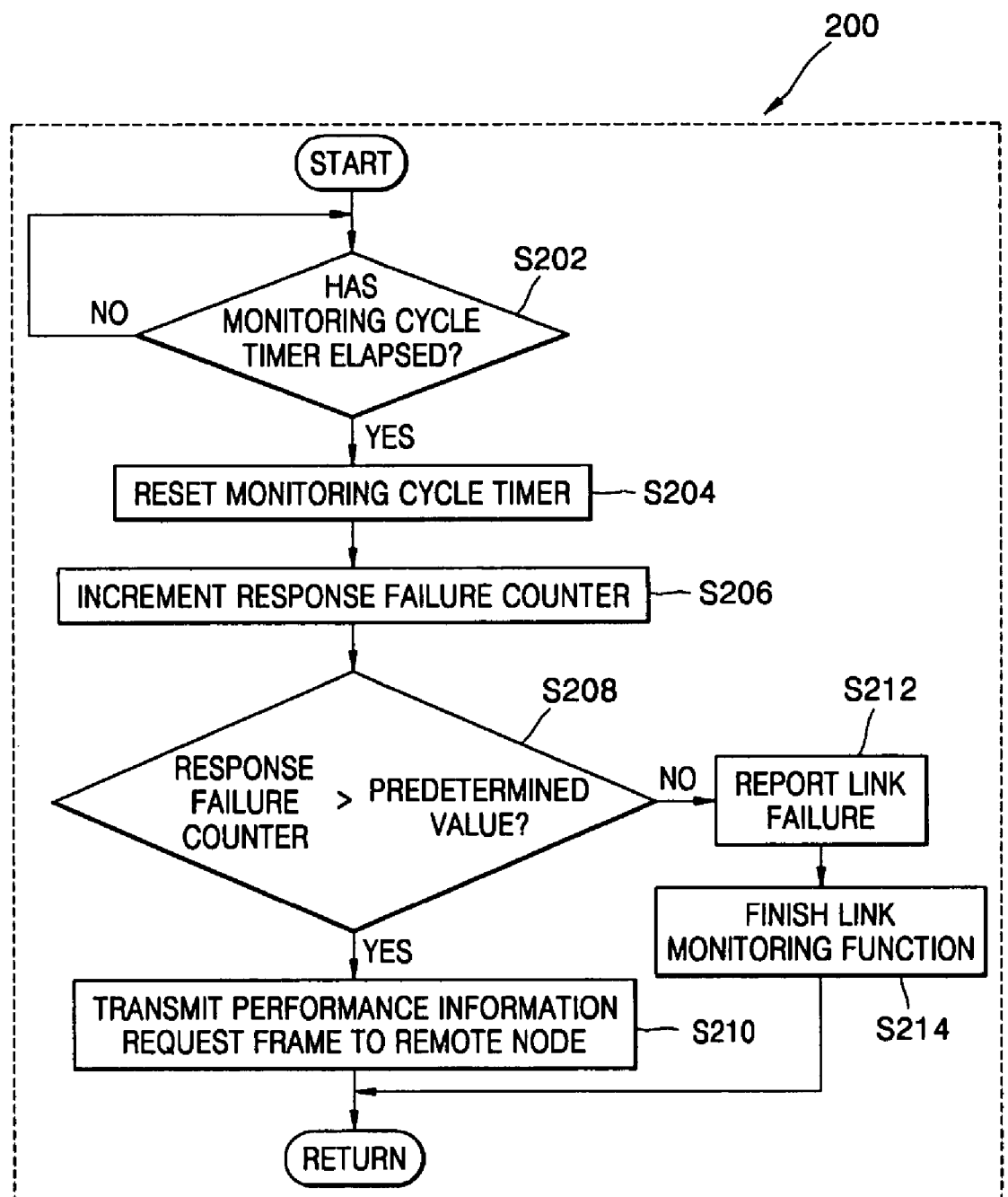
FIG. 3 is a flowchart of a monitoring cycle expiration checking subroutine of the link performance monitoring method in the EPON according to the embodiment of the present invention.
Figure 4:
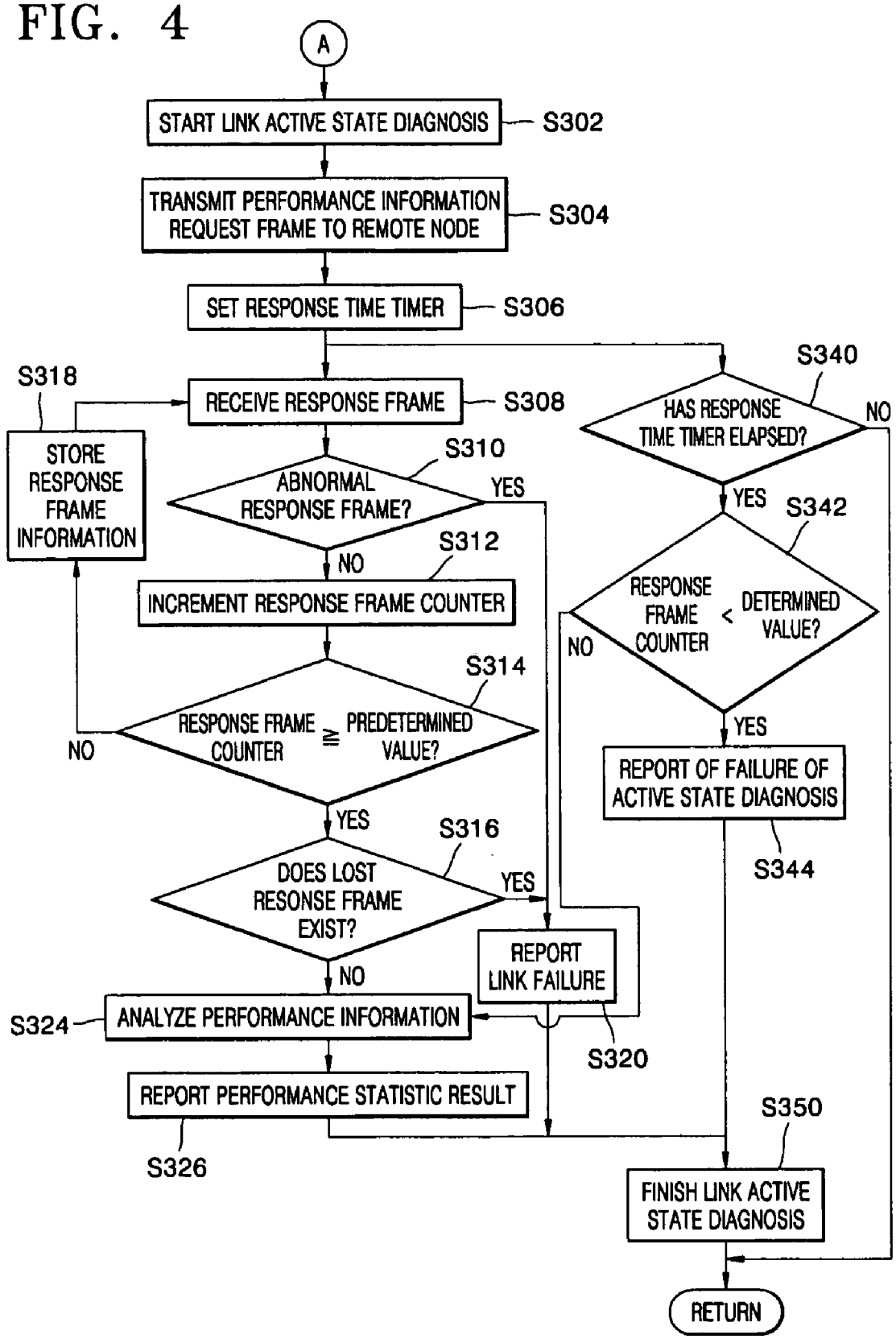
FIG. 4 is a flowchart of a link active state diagnosing method in the EPON according to the embodiment of the present invention.
Figure 5A:
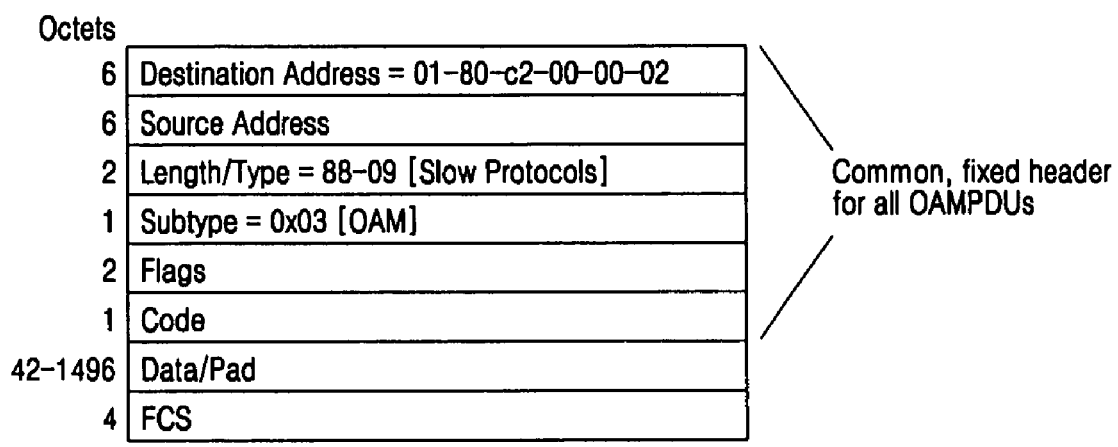
FIG. 5A illustrates a structure of a general Ethernet OAM frame.
Figure 5B:
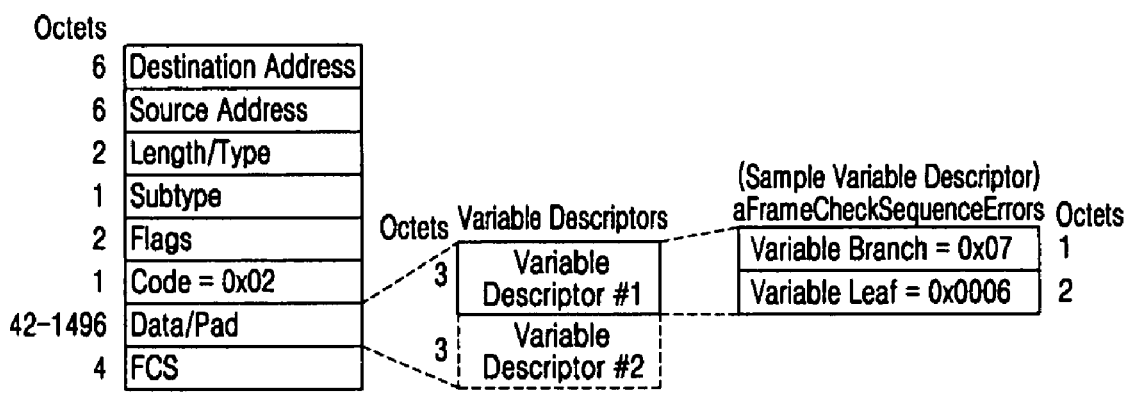
FIG. 5B illustrates a structure of a variable request OAM frame.
Figure 5C:
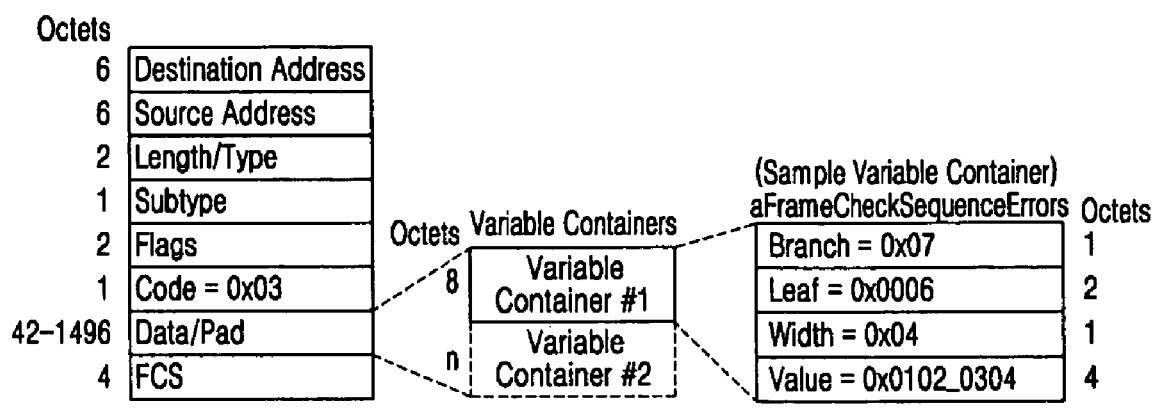
FIG. 5C illustrates a structure of a variable response OAM frame.

FIG. 1 is a flowchart of a link performance monitoring method in an Ethernet passive optical network (EPON) according to an embodiment of the present invention; FIG. 2 is a flowchart of a monitoring cycle modifying subroutine of the link performance monitoring method in the EPON according to the embodiment of the present invention; FIG. 3 is a flowchart of a monitoring cycle expiration checking subroutine of the link performance monitoring method in the EPON according to the embodiment of the present invention; FIG. 4 is a flowchart of a link active state diagnosing method in EPON according to the embodiment of the present invention; and FIG. 5 illustrates structures of Ethernet operations, administration, maintenance (OAM) frames used in the present invention, wherein FIG. 5A illustrates a structure of a general Ethernet OAM frame, FIG. 5B illustrates a structure of a variable request OAM frame, and FIG. 5C illustrates a structure of a variable response OAM frame.

The present invention relates to a link OAM method in an Ethernet passive optical network (EPON). That is, the present invention provides a method of monitoring link performance and diagnosing an active link state in the EPON. The link OAM method according to the present invention checks the link performance and operation before or during the operation of the link, and can be activated or deactivated by an operator. In the present invention, a message for providing the OAM function between an optical line termination (OLT) and an optical network unit (ONU) is formatted according to a definition in the IEEE 802.3ah standard.

The EPON having low cost and high efficiency has a subscriber network structure that several ONUs are connected to the OLT in a branch-link structure using a passive optical splitter. According to physical topology characteristics of the EPON of the present invention, the network is accessed from the ONU (upstream transmission) using a point-to-point transmission structure and to the OLT is accessed from the network (downstream transmission) using a point-to-multipoint nonsymmetrical transmission structure. Accordingly, an Ethernet link between the OLT and the ONU is identified and managed using a logic link emulated by bidirectional point-to-point connection in the EPON of the present invention. This function is realized by the multi-point control protocol (MPCP) of the IEEE 802.3ah standard.

The link OAM function suggested in the IEEE 802.3ah standard is a standard for a point-to-point Ethernet link. Accordingly, in order to apply the link OAM function to the EPON of the present invention, an MPCP logic link which has the OLT and the ONU as terminal points must be applied. Using the method of the link performance and diagnosing the active state of the link according to the present invention, the MPCP logic link between the OLT and the ONU is applied and the logic link between the both terminal points is predetermined by an auto discovery function of the MPCP.

Referring to FIGS. 1 through 3, a method of monitoring the link performance in the EPON according to an embodiment of the present invention will now be described.

In this method, a local node periodically collects performance information of a remote node and monitors errors or performance deterioration on a link layer when data bidirectionally flows in an active state.

The method can be started or finished by an operator.

For example, as illustrated in FIG. 1, if the link performance monitoring function is selected by the operator (S12), the link performance monitoring function starts (S14). Then, a local node sets a monitoring cycle timer and a monitoring period timer and periodically transmits a performance information request frame to a remote node (S16, S18, and S20).

The method of monitoring the link performance according to the present invention uses a variable request OAM frame (FIG. 5B) among Ethernet OAM frame (FIG. 5A) in the IEEE 802.3ah standard illustrated in FIG. 5 as the performance information request frame which is transmitted from the local node to the remote node. FIG. 5C illustrates a variable response OAM frame corresponding to the variable request OAM frame of FIG. 5B. The method of monitoring link performance according to the embodiment of the present invention can specify a branch number and a leaf number to media access control (MAC) performance information (Clause 30) suggested in the IEEE 802.3 standard as the performance information in a desired remote node.

The MAC performance information used in the method of monitoring link performance according to the present invention is as follows:

FCS errored frames

Frames transmitted OK.

Frames received OK.

Bytes transmitted OK.

Bytes received OK.

The remote node which receives the performance information request frame transmitted from the local node immediately collects the link performance information and transmits the collected information to the local node in a format which is predetermined in accordance with an OAM frame format. That is, the remote node collects the link performance information corresponding to the performance information request frame from the local node and then transmits a response OAM frame to the local node.

If the local node receives the response OAM frame from the remote node (S22), the local node resets a response failure counter (S26) and analyzes the performance information contained in the response OAM frame and determines whether the link performance has deteriorated or whether a failure has occurred (S28 and S30). If the link performance has deteriorated or the failure has occurred, that is, if the deterioration of the link performance or the degree of the failure exceeds a predetermined threshold, the local node reports to an upper layer that a failure has occurred (S32). In operation S30, if the link performance has not deteriorated or a failure has not occurred, the local node processes statistics on the link performance (S34).

In the method of monitoring the link performance according to the embodiment of the present invention, references for measuring the link performance are as follows:

threshold of a frame check sequence (FCS) error data transmission/reception rate of the frame which is transmitted from the local node and the frame which is received by the remote node during a predetermined period data transmission/reception rate of the frame which is received by the local node and the frame which is transmitted from the remote node during a predetermined period transmission/reception data rate (link availability ratio) of the remote node On the other hand, if the local node does not receive the response OAM frame from the remote node in operation (S22), it is determined whether a failure has occurred in the link performance monitoring function (S24). If a failure has occurred, the link performance monitoring function is forced to finish (S38). It will be apparent to those of ordinary skill in the art that the link performance monitoring function ends when the monitoring period timer set in operation S18 elapses.

The performance information of the remote node is collected and monitored by the periodical request/response of the OAM frame. The operator predetermines the monitoring cycle and may modify the monitoring cycle, if necessary. The monitoring cycle is modified by a separate monitoring cycle modifying subroutine 100 illustrated in FIG. 2 and they will now be described.

If an operator wants to modify the link performance monitoring cycle, it is determined whether the link performance monitoring function is in the active state (S102). If the link performance monitoring function is in the active state, the link monitoring cycle is set to a desired value (S104 and S106).

In the method of monitoring the link performance according to the present invention, an operator predetermines a link performance monitoring period and, if the set link performance monitoring period elapses, the link performance monitoring function automatically ends preventing the OAM frame from being transmitted between the local node and the remote node. However, in the method of monitoring the link performance according to the present invention, an operator interface which can intervene to stop the link performance monitoring function can be set so that faulty operation of the link performance monitoring function can be prevented.

Accordingly, although the performance information can be collected in the active state over a period of time, the remote node may not respond to the performance information request. The reason is because the request/response OAM frame is lost in the logic link or failure occurs in the physical link. Accordingly, the present invention uses a response failure counter. The monitoring cycle expiration check subroutine 200 will now be described.

Referring to FIG. 3, it is determined whether the monitoring cycle elapses (S202). If the monitoring cycle elapses, the local node resets the monitoring cycle timer whenever transmitting the OAM frame to the remote node and increments the response failure counter (S204 and S206). If the local node receives an efficient response OAM frame from the remote node, the local node resets the response failure counter. That is, if the local node successively receives the response without a failure, the response failure counter is always reset to zero when the link performance monitoring cycle starts.

However, if the response failure counter is equal to or greater than 1, at least one response frame reception failure has occurred in the local node. If the reception failure is repeated, it may be considered a physical link failure. Accordingly, if the value of the response failure counter exceeds a predetermined value (S208), the local node notifies an upper application layer that a serious failure has occurred in the link performance monitoring function and automatically ends the link performance monitoring function (S212 and S214). If the response failure counter does not exceed the predetermined value in operation S208, the local node transmits the performance information request frame for monitoring the link performance to the remote node (S210).

The method of monitoring the link performance according to the present invention illustrated in FIGS. 1 through 3 can be performed only when an OAM layer exists between the local node and the remote node. Accordingly, a discovery process for determining whether the OAM layer exists in the node is used when setting the logic link. The discovery process is defined in the IEEE 802.3ah standard. In the present invention, a special OAM frame for notifying the remote node of the start and the end of the link performance monitoring function is not required and all the items related to the start and the end are solved by performing an inherent function of the local node. Accordingly, the local node is an active OAM node (IEEE 802.3ah) which can generate the OAM frame, and the remote node is a passive OAM node which can respond to the performance information request.

Referring to FIG. 4, the method of diagnosing the active state of the link according to the present invention will be described.

When the link is in the active state, the local node can diagnose the current active state of the link by the response OAM frame of the remote node. In the present invention, each of the logic links of the EPON uses a certain data rate for transmitting/receiving the MPCP frames, in order to maintain the succession of the link.

The method of diagnosing the active state of the link according to the present invention begins by operator request. That is, as illustrated in FIG. 1, if the operator of the EPON selects the link active state diagnosing function (S300), the link active state diagnosing function begins (S302; FIG. 4).

The local node transmits to the remote node a predetermined number of successive OAM frames which request the performance information of the remote node (S304), and sets a response time timer (S306).

The remote node transmits the response OAM frames to the local node, that is, predetermined performance information corresponding to the OAM frames. If the local node receives the response OAM frames (S308), the local node analyzes the transmission/reception state information contained in the response OAM frames and determines whether the response OAM frame contains an FCS error (S310). If it is determined that the response OAM frame has no errors, the response frame counter is incremented, and, otherwise, the local node reports to the upper layer that a failure has occurred in the corresponding link (S320). Then, the link active state diagnosing function ends (S350).

In operation S310, normal response OAM frames represent a data rate of the remote node maintained above a predetermined value and thus a corresponding logic line is in the active state.

After operation S312, it is determined whether a value of the response frame counter equals a predetermined number of the OAM frames transmitted to the remote node (S314). If the value of the response frame counter equals a predetermined number of the OAM frames, it is determined whether a lost response frame exists among the response OAM frames (S316). If it is determined that a lost response frame exists in the response OAM frame in operation 316, a serious failure is considered to have occurred in the link and a failure message is reported to the upper layer (S320). For example, a normal response frame from the remote node can be delayed or lost.

In operation 314, if it is determined that the value of the response frame counter is less than the predetermined number of the OAM frames, the local node stores the information contained in the response OAM frame (S318) and continuously receives the response OAM frames (S308).

In operation 316, if a response OAM frame is not lost, the performance information is analyzed (S324) and the performance statistic result is reported to the upper layer (S326).

In the method of diagnosing the active state of the link according to the current embodiment of the present invention, references for analyzing the link performance are as follows:
Threshold of the FCS error
Minimum data rate of the frames received by the remote node
Minimum data rate of the frames transmitted from the remote node In the method of diagnosing the active state of the link according to the current embodiment of the present invention, references for analyzing the link performance are set to predetermined values, and, if predetermined values are exceeded, a failure is deemed to have occurred in the link which is in the active state. The format of the OAM frame for the performance information used in the method of diagnosing the active state of the link according to the current embodiment of the present invention is equal to that of the link performance monitoring method of the previous embodiment illustrated in FIGS. 1 through 3.

On the other hand, if the response time timer set in operation S306 elapses during the link active state diagnosing process (S340), the value of the response frame counter is compared with the predetermined number of the OAM frames (S342). If the value of the response frame is less than the predetermined number, the link active state diagnosis failure is reported to the upper layer and the link active state diagnosing function ends (S344 and S350). In operation S342, if the value of the response frame counter is equal to or greater than the predetermined number of the OAM frames, the performance information contained in the response OAM frame is analyzed and then the performance statistic result is reported to the upper layer (S324 and S326).

As mentioned above, according to the method of monitoring the link performance and diagnosing the active state of the link in the EPON of the present invention, the link performance is efficiently monitored and the active link state is efficiently diagnosed without preventing the data from flowing to the logic links in the EPON.

Also, according to the method of monitoring the link performance and diagnosing the active state of the link in the EPON of the present invention, the performance of the link which is in the active state can be monitored and the failure of the link layer can be diagnosed by a simple operator command.

Further, the method of monitoring the link performance and diagnosing the active link state in the EPON of the present invention can be applied to a logic link of the EPON or a point-to-point connection Ethernet link and can be used for monitoring successive links which are in an on-line state and diagnosing the active state.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of monitoring link performance and diagnosing an active link state without interrupting data flow to logic links which are in active states in an Ethernet passive optical network (EPON), comprising:
   a) allowing an operator of the EPON to select one of a link performance monitoring function and a link active state diagnosing function;
   b-1) if the link performance monitoring function is selected, setting a monitoring cycle timer and periodically transmitting a performance information request frame from a local node to a remote node;
   b-2) if the remote node receives the performance information request frame, collecting corresponding link performance information and transmitting a response frame from the remote node to the local node in a format which is predetermined in accordance with a corresponding frame format;
   b-3) if the local node receives the response frame from the remote node, analyzing the performance information of the response frame and determining whether the link performance has deteriorated or if a failure has occurred in the local node;
   b-4) if the deterioration of the link function or a degree of the failure reaches a predetermined threshold, reporting to an upper layer that a failure has occurred.

2. The method of claim 1, wherein the performance information request frame is a variable request frame corresponding to an Ethernet operations, administration, and maintenance (OAM) frame of the IEEE 802.3ah standard.

3. The method of claim 1, wherein the performance information of the remote node is specified by a branch number and a leaf number for media access control (MAC) performance information defined in IEEE 802.3ah standard.

4. The method of claim 3, wherein the MAC performance information includes:
   FCS errored frames
   Frames transmitted OK
   Frames received OK
   Bytes transmitted OK
   Bytes received OK.

5. The method of claim 1, wherein references for measuring the link performance comprise:
   threshold of a FCS (frame check sequence) error
   data transmission/reception rate of the frame which is transmitted from the local node to the remote node during a predetermined period
   data transmission/reception rate of the frame which is transmitted from the remote node to the local node during a predetermined period
   transmission/reception rate (link availability ratio) of the remote node.

6. The method of claim 1, wherein the monitoring cycle of the link can be modified during the active time of the link performance monitoring function and the monitoring time is predetermined by the operator, and, if the set monitoring time elapses, the link performance monitoring function automatically ends.

7. The method of claim 6, wherein, if a failure of the link performance monitoring function has occurred in the active period of the link performance monitoring function, the link performance monitoring function is forced to finish.

8. The method of claim 2, further comprising:

incrementing a response failure counter whenever the monitoring cycle elapses and the OAM frame is transmitted to the remote node, and resetting the response failure counter when an efficient response OAM frame is transmitted from the remote node to the local node; and incrementing the response failure counter whenever a response failure occurs between the local node and the remote node and, if the value of the response failure counter exceeds a predetermined value, ending the link performance monitoring function.

9. The method of claim 1, wherein the local node is an active OAM node which can generate an OAM frame and the remote node is one of a passive OAM node and an active OAM node.

10. The method of claim 1, further comprising:

if the link active state diagnosing function is selected, c-1) successively transmitting from the local node a predetermined number of OAM frames which request the performance information of the remote node;

c-2) if the remote node receives the OAM frames, transmitting the performance information corresponding to the OAM frames in an OAM frame format, from the remote node to the local node;

c-3) analyzing transmission/reception state information contained in the performance information received from the remote node to determine whether an FCS error exists, and determining that the link is in an active state if the data rate of the remote node is maintained above a predetermined value; and c-4) if a normal response from the remote node is delayed or a lost response frame exists in the response frames, determining that a failure has occurred in the link and transmitting a failure message from the local node to an upper layer.

11. The method of claim 10, wherein a predetermined data rate is used for transmitting/receiving a multi point control protocol (MPCP) frame to maintain the succession of the link, and the local node requests the successive performance information of the link to the remote node and analyzes whether the transmission/reception data rate is maintained above the predetermined value by the remote node.

12. The method of claim 11, wherein references for analyzing whether the transmission/reception data rate is maintained above the predetermined value by the remote node comprise:

Threshold of the FCS error

Minimum data rate of the frames received by the remote node

Minimum data rate of the frames transmitted from the remote node wherein the references are set to predetermined values and, if the predetermined values are exceeded, it is determined that a failure has occurred in the link which is in the active state.

* * * * *